United States Patent [19]

Shimizu et al.

[11] Patent Number: 5,254,646
[45] Date of Patent: Oct. 19, 1993

[54] POLYMER SCALE PREVENTIVE AGENT, POLYMERIZATION VESSEL FOR PREVENTING POLYMER SCALE DEPOSITION, AND PROCESS OF PRODUCING POLYMER USING SAID VESSEL

[75] Inventors: Toshihide Shimizu, Urayasu; Minoru Shigemitsu, Ibaraki, both of Japan

[73] Assignee: Shin-Etsu Chemical Co., Ltd., Tokyo, Japan

[21] Appl. No.: 755,764

[22] Filed: Sep. 6, 1991

[30] Foreign Application Priority Data

Sep. 7, 1990 [JP] Japan ................................. 2-238530
Sep. 7, 1990 [JP] Japan ................................. 2-238531

[51] Int. Cl.$^5$ ............................................. C08F 2/00
[52] U.S. Cl. ........................................ 526/62; 526/74; 526/200
[58] Field of Search .......................... 526/62, 74, 200

[56] References Cited

U.S. PATENT DOCUMENTS 5,147,455  9/1992  Watanabe et al. .................... 526/62
5,153,281 10/1992  Shimuzu et al. ..................... 526/62

Primary Examiner—Joseph L. Schofer
Assistant Examiner—Tom Weber
Attorney, Agent, or Firm—Nixon & Vanderhye

[57] ABSTRACT

A polymer scale preventive agent for use in polymerization of a monomer having an ethylenic double bond, comprising at least one compound selected from the group consisting of agars and agaroses. A process of producing a polymer by polymerizing the monomer in a polymerization vessel having on its inner wall surfaces a coating comprising the scale preventive agent. Polymer scale deposition inside the polymerization can be effectively prevented, and polymers with high whiteness can be prepared. Moreover, the scale preventive agent no poisonousness and is highly safe.

4 Claims, No Drawings

5,254,646

POLYMER SCALE PREVENTIVE AGENT, POLYMERIZATION VESSEL FOR PREVENTING POLYMER SCALE DEPOSITION, AND PROCESS OF PRODUCING POLYMER USING SAID VESSEL

BACKGROUND OF THE INVENTION

1. Field of the Invention

The present invention relates to a polymer scale preventive agent in polymerization of a monomer having an ethylenic double bond, a polymerization vessel for preventing polymer scale deposition, and a process of producing polymer using said vessel.

2. Description of the Prior Art

In processes of preparing polymers by polymerizing a monomer in a polymerization vessel, the problem that polymer deposits on the inner wall surface and so forth in the form of scale, is known. The deposition of the polymer scale on the inner wall results in disadvantages that the yield of the polymer and cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer and operators may be exposed thereto, which may cause physical disorders in the operators.

Heretofore, as methods for preventing polymer scale deposition on the inner wall surface nd so forth of a polymerization vessel in polymerization of a monomer having an ethylenic double bond, methods in which substances exemplified below are coated on the inner wall surface, etc. as a scale preventive agent, have been known.

For example. particular polar organic compounds (Japanese Patent Publication (KOKOKU) No.45-30343(1970)). a dye or pigment (Japanese Patent Publication (KOKOKU) Nos.45-30835(1970) and 52-24953(1977)), an aromatic amine compound (Japanese Pre-examination Patent Publication (KOKAI) No.51-50887(1976)) and a reaction product of a phenolic compound and an aromatic aldehyde (Japanese Pre-examination Patent Publication (KOKAI) No.55-54317(1980)) are disclosed.

In the meantime, vinyl chloride polymers obtained by polymerization are required to have a good whiteness; for example, they are required to have an L value according to the Hunter's color difference equation, which is described in JIS Z 8730 (1980), of 70 or more.

The prior art polymer scale preventive agents generally include a great number of colored substances as exemplified typically by the dyes and pigments described in Japanese Patent Publication (KOKOKU) Nos.45-30835(1970) and 52-24953(1977), the aromatic amine compounds described in Japanese Pre-examination Patent Publication (KOKAI) No.51-50887(1976), and the reaction products of a phenolic compound and an aromatic aldehyde described in Japanese Pre-examination Patent Publication (KOKAI) No.55-54317(1980). Presumably, for this, a colored polymer is obtained in suspension polymerization and the like of vinyl chloride, etc. in a polymerization vessel which has a coating comprising the polymer scale preventive agent described above formed on its inner wall. That is, according to measurement of the lightness L described above, the L may be measured to be 65 or less, and coloration is thereby confirmed. Presumably, the coloration is caused by incorporation of components of the coating which has dissolved or peeled into the polymerization system. Improvement is required for producing a polymer of high quality.

Moreover, the prior art polymer scale preventive agents generally include poisonous substances as exemplified typically by terrible substances such as aniline, nitrobenzene, formaldehyde, etc. among the polar compounds described in the above-mentioned Japanese Patent Publication (KOKOKU) No.45-30343(1970), and pigments containing a heavy metal such as chromium or lead among the pigments described in Japanese Patent Publication (KOKOKU) No.45-30835(1970). The dyes described in Japanese Patent Publication (KOKOKU) Nos.45-30835(1970) and 52-24953(1977) include some dyes that involve concern about carcinogenesis. Therefore, use of these substances may cause problems in safety of operators.

SUMMARY OF THE INVENTION

An object of the present invention is to provide a polymer scale preventive agent which is capable of preventing polymer scale deposition effectively, puts no color to product polymers to thereby produce the polymers with high whiteness, and are not poisonous and therefore causes no concern with respect to safety or sanitation, a polymerization vessel capable of preventing polymer scale deposition using the same preventive agent, and a process of producing a polymer using the polymerization vessel.

Thus. the present invention provides, as a means of attaining said object, a polymer scale preventive agent for use in polymerization of a monomer having an ethylenic double bond. comprising (A) at least one compound selected from the group consisting of agars and agroses.

In addition, the present invention also provides a polymer scale preventive agent, as an embodiment, comprising (B) a saccharide which is capable of reacting with said agars and/or agaroses (A).

Further the present invention provides a polymerization vessel having on its inner wall surfaces a coating comprising said polymer scale preventive agent.

Furthermore, the present invention provides a process of producing a polymer by polymerization of a monomer having an ethylenic double bond in a polymerization vessel. comprising the step of carrying out said polymerization in said polymerization vessel, whereby the deposition of polymer scale is prevented.

According to the present invention, high whiteness polymers with an L value of 70 or more can be prepared. Moreover, the scale preventive agent used in the present invention has no poisonousness and so forth and is highly safe; hence there is no problem about safety or sanitation of operators.

Further, according to the present invention, polymer scale deposition can be effectively prevented, irrespectively of polymerization conditions such as the kinds of a monomer or a polymerization initiator, the type of polymerization, the kind of the material constituting the inner wall of polymerization vessels, etc.

DETAILED DESCRIPTION OF PREFERRED EMBODIMENTS

Polymer scale preventive agent (A) Agar and Agarose

The polymer scale preventive agent of the present invention comprises an agar and/or an agarose as an essential component, and encompasses contains one using either an agar or an agarose and one using both of them.

Agar is known as an inorganic salt, such as calcium salts, calcium-magnesium salts or the like, of a galactan sulfate composed of a long chain formed from about 52 D-galactopyranoses which are linked through 1,3-glycoside bonding and one L-galactopyranose-C(6)-sulfate bonded to one terminal of the long chain. (Refer to BIOLOGICAL DICTIONARY (Seibutsugaku Jiten), 1983, Iwamami Shoten, Tokyo) Agar is composed of 70% of agarose and about 30% of agaropectin and is a mucilage existing in an outer layer or a gap of cell walls of red algae (PHODOPHYTA) such as Gelidium, Gracilaria, Grateloupia, Hypnea and Gigartina.

Agarose is one of components of agars as described above and is prepared by isolation from agars.

(B) Saccharide capable of reacting with Component (A)

A saccharide (B) capable of reacting with agars and agaroses (A) is optionally added. This addition of the Component (B) facilitates preparation of a coating liquid and formation of a coating as described later.

The saccharide of this type includes, for example, monosaccharides such as galactose, mannose, frucose, sorbose, xylose, arabinose, ribose, rhamnose, fucose, etc.; disaccharides such as trehalose, saccharose, sophorose, turanose, laminaribiose, nigerose, maltose, cellobiose, lactose, gentiobiose, isomaltose, melibiose, rutinose, primeverose, vicianose, etc.; plant mucous polysaccharides such as pectin, pectic acid, pectinic acid, fucoidin, carragheenin, laminarin, guar gum, locust-bean gum, alginic acid, propylene glycol alginate, etc.; animal mucous polysaccharides such as hyaluronic acid, chondroitin sulfuric acid, heparin, kerato sulfuric acid, charonin sulfuric acid, limacoitin sulfuric acid, etc.; starches and derivatives thereof such as amylose, amylopectin, dextrin, oxidized starch, acetyl starch, nitro starch, methyl starch, carboxymethyl starch, etc.; cellulose derivatives such as methyl cellulose, ethyl cellulose, hydroxypropyl cellulose, hydroxypropylmethyl cellulose, glycol cellulose, benzyl cellulose, cianoethyl cellulose, triphenylmethyl cellulose, formyl cellulose, cellulose propyonate, cellulose butyrate, cellulose acetate, cellulose acetate butyrate, sulfonic acid cellulose ester, carbamic acid cellulose ester, nitrocellulose, carboxymethyl cellulose, cellulose sulfate, cellulose phosphate, cellulose xanthogenic acid, etc.; and so forth. These can be used singly or in combination of two or more.

The above-mentioned saccharide (B) is used normally in an amount of 0.1 to 1,000 parts by weight, preferably 1 to 600 parts by weight, per 100 parts by weight of the agar and/or agarose (A). If the Component (B) is used in too small an amount relatively to the Component (A), the effect by use of the Component (B) cannot be obtained, so that heating is needed when a coating liquid is stored or applied and hence the coating liquid is difficult to handle. If the Component (B) is used in too large an amount, the scale preventive effect is lowered.

The polymer scale preventive agent of the present invention is used, for example, for forming a coating on the inner wall surfaces, etc. of a polymerization vessel, or for addition into a polymerizing mixture, whereby the deposition of scale on the inner wall surfaces, etc. in a polymerization vessel is prevented. Usually in the case of forming said coating on the inner wall surfaces, etc. in a polymerization vessel, the polymer scale preventive agent is used in the state of solution or dispersion, i.e., a coating liquid.

Preparation of a coating liquid

The coating liquid described above is prepared by dissolving or dispersing said Component (A) and optionally said Component (B) in an aqueous solvent such as water, etc.

In this coating liquid, other than water, a mixed solvent of water with other suitable solvents may be used as necessary. The other suitable solvents include, for example, alcohols such as methanol, ethanol, propanol, butanol, 2-butanol, 2-methyl-1-propanol, 2-methyl-2-propanol, 3-methyl-1-butanol, 2-methyl-2-butanol, 2-pentanol, etc.; ketones such as acetone, methyl ethyl ketone, methyl isobutyl ketone, etc.; esters such as methyl formate, ethyl formate, methyl acetate, methyl acetoacetate, etc.; ethers such as 4-methyldioxolane, ethylene glycol diethyl ether, etc.; furans; and aprotic solvents such as dimethylformamide, dimethyl sulfoxide, acetonitrile, etc. These solvents may be used singly or in combination of two or more thereof to prepare a mixed solvent with water.

Usually agars or agaroses which is an essential component of the coating liquid does not dissolve in water at a temperature below 80°–90° C. For this reason, when preparing a coating liquid, agars and/or agaroses are dissolved in an aqueous solvent of a temperature of 90° C. or above, preferably in boiling water. In the case of using a saccharide (B) together, the saccharide (B) is dissolved in water with the agar or agarose. In the case that said saccharide is not used, the solution of the agar or agarose prepared as described above becomes gel when the solution has been cooled to room temperature, and once gelation of a solution has occurred, the gelled solution may not return to the original solution state even if the temperature of solution is elevated again. Therefore, the coating solution prepared as above is applied on the inner wall of a polymerization vessel while it is kept at a temperature where gelation does not occur, preferably at 40° C. or higher, and the coated liquid is then dried at the temperature. When applying coating liquid, for the same reason, it is desirable to heat the inner wall of a polymerization vessel in advance to a temperature where gelation dose not occur, preferably to a temperature above 40° C., for preventing the gelation of a coating just after application. The coating liquid also needs to be kept at a temperature where gelation does not occur if it is stored for a certain period. After applying a coating liquid on the inner wall of a polymerization vessel and drying the coating are thus completed, it is desirable to cool the coating formed to a temperature of 30° C. or below. By this cooling operation, the coating is made to firmly adhere to the inner wall of the polymerization vessel. Without this cooling operation, the coating may has poor durability and may easily dissolve in a polymerization medium, so that sufficient scale preventing action can be obtained with difficulty.

On the other hand, in the case the saccharide (B) capable of reacting with the agar or agarose (A) is used, the Components (A) and (B) react when they are dissolved in a solvent. Therefore, if a coating liquid prepared at a high temperature mentioned above is cooled to the normal temperature, gelation of the coating liquid does not occur and the liquid can keep a liquid state. In this case, the temperature of the coating liquid or the temperature for drying is not particularly limited; the coating operation can be conducted at room temperature, and the drying may be carried out at room temperature to 100° C. Cooling after the formation of the coating is not necessary.

Although the reaction of the Component (A) and the Component (B) in a coating liquid is not necessarily clear, it is presumed that hydrogen bonds are formed. Presumably, due to the hydrogen bonds between the Component (A) and the Component (B), even if the coating liquid prepared at a high temperature described above is cooled to ordinary temperature, gelation of the coating liquid does not occur and it can keep a liquid state.

The concentration of the Component (A) in a coating liquid or the total concentration of the Component (A) and the Component (B) if the Component (B) is present in the coating liquid, is not particularly limited as long as the preferred coating amount, i.e., the total weight of the Component (A) and optionally the Component (B) per unit area described later is attained, but normally it may be in the range of from 0.005 to 10% by weight, preferably from about 0.01 to 5% by weight.

Other Components

In the polymer scale preventive agent, especially in the coating liquid, of the present invention, moreover, a cationic surfactant, a nonionic surfactant, an anionic surfactant, and so forth can be added if necessary.

Materials which can be added other than those described above include, for example, silicic acids or silicates such as orthosilicic acid, metasilicic acid, mesodisilicic acid, mesotrisilicic acid, mesotetrasilicic acid, sodium metasilicate, sodium orthosilicate, sodium disilicate, disilicate, sodium tetrasilicate and water glass; metallic compounds such as oxygen acid salts, acetates, nitrates, hydroxides or halides of a metal selected from alkali earth metals such as magnesium, calcium, strontium, and barium, zinc family metals such as zinc, aluminum family metals such as aluminum, and platinum family metals such as ruthenium, rhodium, palladium, osmium, iridium, and platinum; and inorganic colloids such as ferric hydroxide colloid, colloid of silicic acid, colloid of barium sulfate, and colloid of aluminum hydroxide. The above-mentioned inorganic colloids include colloids prepared, for example, by mechanical crushing, irradiation with ultrasonic wave, electrical dispersion or chemical methods.

The pH of a coating liquid is not particularly limited. In the case the pH of a coating liquid needs to be adjusted, an acid or an alkali may be added as a pH adjuster to attain a suitable pH, as necessary. The acid which may be used includes, for example, posphoric acid, phytic acid, hydrochloric acid, acetic acid, glycolic acid, and tartaric acid. The alkali which may used includes, for example, sodium hydroxide, potassium hydroxide, calcium hydroxide, and aqueous ammonia.

Formation of coating

When the coating liquid prepared as described above is used for forming a coating on the inner wall surface of a polymerization vessel, first, the coating liquid is applied to the inner wall surface of the polymerization vessel and then dried sufficiently, followed by washing with water if necessary. A coating is formed by these poerations on the inner wall surface of the polymerization vessel; hence the polymer scale deposition thereon can be prevented.

The above-mentioned coating is preferably formed on not only the inner wall surfaces of a polymerization vessel but also other parts with which the monomer comes into contact during polymerization. For example, it is preferred to form the coating by applying said coating liquid on a stirring shaft, stirring blades, condensers, headers, search coil, bolts, nuts, etc.

More preferably, the coating is formed on not only the parts with which the monomer comes into contact during polymerization but also other parts on which polymer scale may deposit, for example, such as the inner surfaces of equipment and tubes of recovery system for unreacted monomer. These parts, more specifically, are exemplified by the inner wall surfaces of monomer distillation columns, condensers, monomer stock tanks and valves, etc. in said recovery system.

The method of applying the coating liquid on the inner wall surface, etc. of a polymerization vessel is not particularly limited, and includes, for example, the brush coating, spray coating, the method of filing the polymerization vessel, etc. with the coating liquid followed by withdrawal thereof, and automatic coating methods as disclosed in Japanese Pre-examination Patent Publication (KOKAI) Nos.57-61001(1982) and 55-36288(1980), and Japanese Patent Publication (KOHYO) Nos.56-501116(1981) and 56-501117(1981), and Japanese Pre-examination Publication (KOKAI) No.59-11303(1984), etc.

The method of drying wet coated surface provided by application of the coating liquid, is not limited, either. The drying is conducted preferably at a temperature within the range from room temperature to 100° C. However, in the case where the above-mentioned saccharide (B) is not used, the drying is conducted preferably at a temperature within the range of from 40° C. to 80° C. Specifically, a method in which, after the liquid is applied, hot air with a suitable elevated temperature is blown to the coated surface, and a method in which the inner wall surface of a polymerization vessel and the surfaces of other parts to be coated are previously heated and the coating liquid is directly applied to the heated surfaces, etc. After dried, the coated surfaces are washed with water if necessary.

The coating after dried is required to contain substantially no moisture. Therefore, the coatings can be acceptable in which a very few water molecules are adsorbed on hydrophilic groups in the molecule of agars or agaroses by hydrogen bonding.

The coating thus formed has normally a coating weight per unit area, of 0.001 g/m$^2$ or more, preferably from 0.05 to 2 g/m$^2$.

The above coating operation may be conducted every 1 to ten-odd batches of polymerization. The formed coating has fairly good durability and retains the polymer scale-preventing action; therefore the coating operation is not necessarily performed for every batch of polymerization. Hence, the productivity of the manufactured polymer is improved.

Addition to polymerization system

Where said saccharide (B) is used with the agar and/or agarose (A) together, the polymer scale preventive agent of the present invention may be added into a polymerization medium. In this case, for example, said coating liquid is used for coating operation, and in addition a small amount of a polymer scale preventive agent in a liquid state like the above coating liquid, is added into the polymerization medium. By this addition, the effect of preventing polymer scale deposition is further enhanced as compared with the case where the coating operation is only conducted. The amount of the polymer scale preventive agent in a liquid state to be added into the polymerization medium, preferably ranges from about 10 ppm to 1,000 ppm based on the whole weight of the monomer having an ethylenic double bond to be charged.

Polymerization

After forming the coating on the inner wall surfaces of a polymerization vessel and other parts with which monomer may come into contact by application of the coating liquid, polymerization is carried out in accordance with conventional procedures therein. That is, a monomer having an ethylenic double bond and a polymerization initiator (catalyst) are charged, and then, a polymerization medium such as water, etc. and, optionally, a dispersing agent such as suspension agents, solid dispersing agents, and nonionic and anionic emulsifying agents, etc. are charged, followed by carrying out polymerization according to conventional methods.

The monomer having an ethylenic double bond to which the method of this invention can be applied includes, for example, vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; and diene monomers such as butadiene, chloroprene and isoprene; aromatic vinyl compounds such as styrene; as well as acrylonitrile, halogenated vinylidenes, and vinyl ethers.

There are no particular limitations on the type of polymerization to which the method of this invention can be applied. The present invention is effective in any types of polymerization such as suspension polymerization, emulsion polymerization, solution polymerization, bulk polymerization, and gas phase polymerization. Particularly, the present method is suitable to polymerizations in an aqueous medium such as suspension or emulsion polymerization.

Specifically, in the case of suspension polymerization and emulsion polymerization, polymerization is generally performed as follows, for instance.

First, water and a dispersing agent are charged into a polymerization vessel, and thereafter a polymerization initiator is charged. Subsequently, the inside of the polymerization vessel is evacuated to a pressure of from about 0.1 to about 760 mm Hg, and a monomer is then charged (whereupon the pressure inside the polymerization vessel usually becomes from 0.5 to 30 kgf/cm$^2$.G). Then, the polymerization is normally carried out at a temperature of from 30° to 150° C. During the polymerization, one or more of water, a dispersing agent and a polymerization initiator may be added, if necessary. Reaction temperature during the polymerization is different depending on the kind of monomer to by polymerized. For example, in the case of polymerizing vinyl chloride, polymerization may be carried out at 30° to 80° C.; in the case of polymerizing styrene, polymerization may be carried out at 50° to 150° C. The polymerization may be judged to be completed when the pressure inside the polymerization vessel falls to from about 0 to 7 kgf/cm$^2$.G or when cooling water which passes through a jacket provided around the polymerization vessel indicates almost the same temperature at the inlet where it is charged and at the outlet where it is discharged (i.e., when liberation of heat due to polymerization reaction has been completed). The water, dispersing agent and polymerization initiator charged for the polymerization are used in amounts of about 20 to 500 parts by weight, about 0.01 to 30 parts by weight, and about 0.01 to 5 parts by weight, respectively, per 100 parts by weight of the monomer.

In the case of solution polymerization, an organic solution such as toluene, xylene, pyridine and the like is used as a polymerization medium in place of water. The dispersing agent is optionally used. The other conditions are generally the same as those described for suspension and emulsion polymerization.

In the case of bulk polymerization, after the inside of a polymerization vessel is evacuated to a pressure of from about 0.01 mm Hg to about 760 mm Hg, a monomer and a polymerization initiator are charged, and then polymerization is carried out at a temperature of from $-10°$ C. to 250° C. For example, in the case of polymerizing vinyl chloride, polymerization is carried out at a temperature of from 30° C. to 80° C.; and in the case of polymerizing styrene, polymerization may be carried out at 50° C. to 150° C.

The method of the present invention is effective in preventing polymer scale from depositing, independent of materials constituting the inner wall, etc. of a polymerization vessel. For example, this method is effective in preventing polymer scale from depositing in polymerization vessels made of a stainless steel or other steels or vessels lined with glass.

Any additive materials that have been added in a polymerization system can be used without any limitation. More specifically, the method of this invention can effectively prevent polymer scale from depositing, even in polymerization systems containing the following additives: for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-methane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as trichloroethylene and mercaptans as exemplified by t-dodecyl mercaptans; and pH adjusters.

EXAMPLE

The present invention is now described in detail by way of working examples and comparative examples. In each of the tables below, Experiment Nos. marked with \* indicate comparative examples, and the other Experiment Nos., working examples of the present invention.

Example 1

Polymerization was carried out in the following manner using a polymerization vessel with an inner capacity of 1,000 liters and having a stirrer.

In each experiment, first, an agar or an agarose was dissolved as an effective component in a solvent heated to a temperature of 90° C. or more as given in Table 1-A to prepare a coating liquid having the concentration as shown in the table. Subsequently, a color of the coating liquid was visually observed.

The effective component and the solvent, and the concentration of the effective component in the coating liquid used in each experiment, and the temperature and the color of the coating liquid are given in Table 1-A. The details of agaroses used are given in Table 1-B.

While the coating liquid prepared as described above was kept at the temperature as given in Table 1-A, it was applied to the inner wall and other parts with which a monomer comes into contact including the stirring shaft and stirring blades of a polymerization vessel heated to a desirable temperature previously, followed by drying and then cooling to form a coating. Experiment of No. 101 is a comparative example in which no coating liquid was applied. The temperature of the inner wall surface of a polymerization vessel, and the temperature for drying and the temperature for cooling in each experiment are given in Table 1-A.

Subsequently, in the polymerization vessel in which a coating had been formed by the coating operation as above, were charged 400 kg of water, 200 kg of vinyl chloride, 250 g of partially saponified polyvinyl alcohol, 25 g of hydroxypropylmethyl cellulose and 75 g of bis(2-ethylhexyl) peroxydicarbonate. Then, polymerization was carried out at 57° C. with stirring for 6 hours. After the completion of the polymerization, the amount of polymer scale depositing on the inner wall of the polymerization vessel and the whiteness of the polymer obtained were measured according to the following.

Measurement of the amount of polymer scale deposition

The scale depositing on the inner wall surface in the area of 10 cm$^2$ were scraped off with a stainless steel spatula as completely as possible to be confirmed with naked eyes, and then the scraped scale was weighted on a balance. Thereafter, the amount of the deposited scale per area of 1 m$^2$ was obtained by multiplying the measured value by 100.

Measurement of whiteness of polymer

A hundred parts by weight of a polymer, one part by weight of a tin laurate stabilizing agent (trade name: TS-101, product of Akishima Chemical Co.) and 0.5 part by weight of a cadmium stabilizing agent (trade name: C-100J, product of Katsuta Kako Co.), and 50 parts by weight of a plasticizer DOP were kneaded at 160° C. for 5 min. with a twin roll mill, and then formed into a sheet 1 mm thick. Subsequently, this sheet was placed in a mold measuring 4 cm × 4 cm × 1.5 cm (thickness), and molded under heating at 160° C. and under a pressure of 65 to 70 kgf/cm$^2$ to prepare a test specimen. This test specimen was measured for lightness L in the Hunter's color difference equation described in JIS Z 8730 (1980). Whiteness was evaluated to become higher with increase in L value.

The L value was determined as follows.

The stimulus value Y of XYZ color system was determined according to the photoelectric tristimulus colorimetry using the standard light C, a photoelectric colorimeter (Color measuring color difference meter Model Z-1001DP, product of Nippon Denshoku Kogyo K.K.) in accordance with JIS Z 8722. As the geometric condition for illumination and receiving of light, the condition d defined in section 4.3.1 of JIS Z 8722 was adopted. Next, L was calculated based on the equation: L=10Y$^{\frac{1}{2}}$ described in JIS Z 8730(1980).

The results are given in Table 1-A.

TABLE 1-A

| Exp. No. | Coating liquid | | | | | Application condition | | | Amount of polymer scale (g/cm$^2$) | L value |
|---|---|---|---|---|---|---|---|---|---|---|
| | Effective component | Solvent (wt. ratio) | Concentration (wt. %) | Temperature (°C.) | color | Temperature of inner wall surfaces (°C.) | Temperature for drying (°C.) | Temperature for cooling (°C.) | | |
| 101* | — | — | — | — | — | — | — | — | 1300 | 73 |
| 102 | Agar | Water | 0.2 | 50 | colorless | 50 | 50 | 40 | 120 | 73 |
| 103 | Agar | Water | 0.2 | 50 | colorless | 50 | 50 | 30 | 8 | 73 |
| 104 | Agar | Water | 0.2 | 50 | colorless | 50 | 50 | 10 | 2 | 73 |
| 105 | Agarose I | Water | 0.5 | 70 | colorless | 70 | 70 | 40 | 100 | 73 |
| 106 | Agarose I | Water/Isobuthyl alcohol (90/10) | 0.5 | 70 | colorless | 70 | 70 | 25 | 5 | 72.5 |
| 107 | Agarose II | Water/Isobuthyl alcohol (90/10) | 0.5 | 40 | colorless | 40 | 40 | 40 | 80 | 73 |
| 108 | Agarose II | Water/Isobuthyl alcohol (90/10) | 0.5 | 40 | colorless | 40 | 40 | 20 | 4 | 73 |
| 109 | Agarose III | Water/Isobuthyl alcohol (90/10) | 1.0 | 60 | colorless | 60 | 60 | 30 | 18 | 73 |

TABLE 1-B

| | Intensity of gel | Supplier |
|---|---|---|
| Agar | — | Wako Junyaku Kogyo K.K. |
| Agarose I | 800 g/cm$^2$ or more | Wako Junyaku Kogyo K.K. |
| Agarose II | 600~800 g/cm$^2$ or more | Wako Junyaku Kogyo K.K. |
| Agarose III | 600 g/cm$^2$ or more | Wako Junyaku Kogyo |

TABLE 1-B-continued

| Intensity of gel | Supplier |
| --- | --- |
| | K.K. |

Example 2

In each experiment, the coating procedure of Example 1 was repeated for a stainless steel polymerization vessel having an inner capacity of 20 liters and equipped with a stirrer, except that a coating liquid in which the effective component and the solvent, the concentration of effective component, and the temperature and the color of the coating liquid are as given in Table 2, was used under the applying conditions given in Table 2. Experiment of No. 201 is a comparative experiment in which no coating liquid was applied.

In the polymerization vessel for which the coating was thus formed, were charged 9 kg of water 225 g of sodium dodecylbenzenesulfonate 12 g of t-dodecyl mercaptan and 13 g of potassium peroxodisulfate. After the inner atmosphere was replaced with a nitrogen gas, 1.3 kg of styrene and 3.8 kg of butadiene were charged, followed by polymerization at 50° C. for 20 hours.

After completion of the polymerization, the amount of polymer scale depositing on the inner wall surface of the polymerization vessel was measured in the same way as in Example 1. The results are given in Table 2.

In each experiment, first, Component (A) (agar or agarose) and Component (B)(a saccharide capable of reacting with Component (A)) were dissolved in a solvent heated to 90° C. or more to prepare a coating liquid with a concentration given in the table. Thereafter, the coating liquid obtained was cooled to room temperature, and the color of the coating liquid was observed visually. Component (A) and Component (B), the total concentration of (A)+(B), the weight ratio of (A)/(B), the solvent, and the color of the coating liquid in each experiment are given in Table 3.

The coating liquid thus prepared was applied to the inner wall and other parts with which a monomer comes into contact including the stirring shaft and stirring blades, followed by drying under heating at 60° C. for 15 min. to form a coating, which was then washed with water.

However, Experiments of Nos. from 301 to 303 are comparative examples in which no coating liquid was applied, or the coating liquid containing either the Component (A) or the Component (B) was applied.

Thereafter, polymerization was performed in the same manner as in Example 1, except for using the polymerization vessel in which the coating had been formed by the coating operation as described above. After completion of the polymerization, the amount of the polymer scale and the whiteness were measured. The results are given in Table 3.

TABLE 3

| | Coating Liquid | | | | | | After cooling | | Amount of polymer scale | |
| --- | --- | --- | --- | --- | --- | --- | --- | --- | --- | --- |
| Exp. No. | Component[1] (A) | Component (B) | Total Concentration (wt. %) | Weight ratio (A)/(B) | Solvent (wt. ratio) | Color | Color | Status | (g/cm$^2$) | L value |
| 301* | — | — | — | — | — | — | Colorless | — | 1300 | 73 |
| 302* | Agar | — | 0.5 | 100/0 | Water | Colorless | Colorless | Gel[2] | 1250 | 73 |
| 303* | — | Glucose | 0.5 | 0/100 | Water | Colorless | Colorless | Liquid | 1200 | 73 |
| 304 | Agar | Glucose | 0.5 | 50/50 | Water | Colorless | Colorless | Liquid | 3 | 72.5 |
| 305 | Agar | Glucose | 0.5 | 90/10 | Water | Colorless | Colorless | Liquid | 8 | 73 |
| 306 | Agar | Glucose | 0.5 | 25/75 | Water | Colorless | Colorless | Liquid | 13 | 72.5 |
| 307 | Agar | Dextrin | 0.2 | 50/50 | Water/Methanol (90/10) | Colorless | Colorless | Liquid | 8 | 73 |
| 308 | Agarose I | Locust-bean gum | 0.2 | 80/20 | Water | Colorless | Colorless | Liquid | 12 | 72.5 |
| 309 | Agarose II | Saccharose | 0.1 | 50/50 | Water/Methanol (90/10) | Colorless | Colorless | Liquid | 5 | 73 |
| 310 | Agarose III | Maltose | 0.1 | 50/50 | Water/Methanol (90/10) | Colorless | Colorless | Liquid | 9 | 73 |

Remarks:
[1] Agaroses I, II and III are noted in Table 1-B.
[2] Unable to apply because of gelling

Example 4

TABLE 2

| | Coating liquid | | | | Application condition | | | Amount of polymer scale (g/cm$^2$) |
| --- | --- | --- | --- | --- | --- | --- | --- | --- |
| Exp. No. | Effective component | Solvent (wt. ratio) | Concentration (wt. %) | Temperature (°C.) | color | Temperature of inner wall surfaces (°C.) | Temperature for drying (°C.) | Temperature for cooling (°C.) | |
| 201* | — | — | — | — | — | — | — | — | 400 |
| 202 | Agar | Water | 0.2 | 50 | colorless | 50 | 50 | 40 | 80 |
| 203 | Agar | Water | 0.2 | 50 | colorless | 50 | 50 | 20 | 3 |
| 204 | Agarose I | Water/Isobuthyl alcohol (90/10) | 0.5 | 70 | colorless | 70 | 70 | 10 | 5 |

Example 3

Polymerization was carried out in the following manner using a polymerization vessel with an inner capacity of 1,000 liters and having a stirrer.

In each experiment, the coating procedure of Example 3 was repeated for a stainless steel polymerization vessel having an inner capacity of 20 liters and equipped with a stirrer, except for using the coating liquid in which the Component (A) and the Component (B), the total concentration of (A)+(B), the weight ratio of (A)/(B), the solvent, and the color of the coating liquid are as given in Table 4. However,. Experiments of Nos. from 401 to 403 are comparative examples in which no coating liquid was applied, or the coating liquid containing either the Component (A) or the Component (B) was applied.

Next, polymerization was performed in the same manner as in Example 2, except for using the polymerization vessel in which the coating operation had been carried out as above. After completion of the polymerization, the amount of the polymer scale was measured in the same way as in Example 1. The results are given in Table 4.

ing on its inner wall surfaces a coating comprising at least one compound selected from the group consisting of agars and agaroses, whereby the deposition of polymer scale is prevented.

2. The process according to claim 1, wherein said coating further comprises a saccharide which can react with agars and agaroses.

3. The process according to claim 1, wherein said monomer is selected from the group consisting of vinyl halides; vinyl esters; acrylic acid, methacrylic acid, and esters and salts thereof; maleic acid and fumaric acid, and esters and anhydrides thereof; diene monomers; aromatic vinyl compounds; acrylonitrile; halogenated vinylidenes; and vinyl ethers.

4. The method according to claim 1, wherein said

TABLE 4

| Exp. No. | Coating Liquid | | | | | | After cooling | | Amount of polymer scale (g/cm$^2$) |
|---|---|---|---|---|---|---|---|---|---|
| | Component[1] (A) | Component (B) | Total Concentration (wt. %) | Weight ratio (A)/(B) | Solvent (wt. ratio) | Color | Color | Status | |
| 401* | — | — | — | — | — | — | — | — | 400 |
| 402* | Agar | — | 0.2 | 100/0 | Water | Colorless | Colorless | Gel[2] | 380 |
| 403* | — | Dextrin | 0.2 | 0/100 | Water | Colorless | Colorless | Liquid | 370 |
| 404 | Agar | Dextrin | 0.2 | 50/50 | Water | Colorless | Colorless | Liquid | 9 |
| 405 | Agarose I | Galactose | 0.5 | 70/30 | Water/Methanol (90/10) | Colorless | Colorless | Liquid | 5 |
| 406 | Agarose I | Galactose | 0.5 | 30/70 | Water/Methanol (90/10) | Colorless | Colorless | Liquid | 7 |

Remarks:
[1]Agaroses I is noted in Table 1-B.
[2]Unable to apply because of gelling.

We claim:

1. A process of producing a polymer by polymerization of a monomer having an ethylenic double bond in a polymerization vessel, comprising the step of carrying out said polymerization in a polymerization vessel having polymerization is carried out as suspension polymerization, emulsion polymerization, solution polymerization, bulk polymerization, or gas phase polymerization.

* * * * *